United States Patent
Konno

(10) Patent No.: US 6,565,781 B2
(45) Date of Patent: May 20, 2003

(54) METHOD FOR CONTROLLING SCREW POSITION IN AN INJECTION MOLDING MACHINE

(75) Inventor: Takeshi Konno, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 53 days.

(21) Appl. No.: 09/870,743

(22) Filed: Jun. 1, 2001

(65) Prior Publication Data

US 2001/0050446 A1 Dec. 13, 2001

(30) Foreign Application Priority Data

Jun. 12, 2000 (JP) .......................... 2000-175017

(51) Int. Cl.[7] .............................................. B29C 45/76
(52) U.S. Cl. .................... 264/40.1; 264/328.1; 425/145
(58) Field of Search .............. 264/40.1, 40.7, 264/328.1; 425/145

(56) References Cited

U.S. PATENT DOCUMENTS

| | | | |
|---|---|---|---|
| 5,554,326 A | * 9/1996 | Nakazawa et al. | 264/40.1 |
| 5,595,693 A | * 1/1997 | Fujita et al. | 264/40.1 |
| 5,914,077 A | * 6/1999 | Fujita | 264/40.1 |
| 5,997,778 A | * 12/1999 | Bulgrin | 264/40.1 |
| 6,042,760 A | 3/2000 | Nakazawa et al. | |
| 6,192,299 B1 | * 2/2001 | Kubota et al. | 700/282 |
| 6,416,694 B1 | * 7/2002 | Ishikawa | 264/40.1 |

FOREIGN PATENT DOCUMENTS

| | | |
|---|---|---|
| EP | 1 018 421 A2 | 12/2000 |
| JP | 10-329180 | 12/1998 |

OTHER PUBLICATIONS

European Search Report EP 01 11 3544, Feb. 21, 2002.

* cited by examiner

Primary Examiner—Jill L. Heitbrink
Assistant Examiner—Monica A Fontaine
(74) Attorney, Agent, or Firm—Squire, Sanders & Dempsey, LLP

(57) ABSTRACT

A method for controlling a screw position of a screw in an injection molding machine uses a high-speed injection and high-speed depressurization method to perform the entire injecting process by controlling speed of the screw. The screw is moved forward to a predetermined first position from an injection start position, and when the screw reaches the predetermined first position, the screw is moved backward to a predetermined second position. The speeds of the forward and backward movement of the screw are controlled in accordance with a screw-position/speed characteristic pattern which is measured in advance, and which is derived from the equation $V=(2 \cdot K \cdot S)^{1/2}$ where V is screw speed, K is screw acceleration, and S is screw position.

6 Claims, 6 Drawing Sheets

METHOD FOR CONTROLLING SCREW POSITION IN AN INJECTION MOLDING MACHINE

BACKGROUND OF THE INVENTION

1. Field of the Invention

The present invention relates to a method for controlling the screw position in an injecting process in an injection molding machine, in particular, to an injection molding machine in which a high-speed injection and high-speed depressurization method is adopted to perform the entire injecting process by controlling the speed of the screw, and relates to a method for controlling the position of the screw in the injection molding machine.

2. Description of the Related Art

A motor-driven injection molding machine is frequently used as an injection molding machine, instead of a hydraulic injection molding machine. Motors developed for the motor-driven injection molding machine have become continuously more sophisticated. More specifically, high speed, high accuracy, high output power (torque), power savings, and the like have been enhanced. However, an increase in performance of the motor as a single unit does not have a direct bearing on an increase in performance of the entire motor-driven injection molding machine.

Generally, in the motor of the motor-driven injection molding machine, a feed back system is constructed having an order of elements based on the fastest response. In other words, the feed back system is constructed in order of current (torque), speed, position, and pressure, as shown in FIG. 1. Measurement signals from respective detectors for measuring the current, the speed, the position, and the pressure are sequentially fed back and are individually compared with target signals, thereby control is effected based on the comparison results.

Pressure is generally used as control information in the injecting process. This means that the pressure by which a molten resin is fed into a metal mold is controlled. However, in this case, since the control information having the slowest response is used, when a high-speed range of a motor is used, actual peak injection pressure significantly exceeds a set pressure, as shown in FIG. 2. This phenomenon is called an overshoot. In other words, since it takes a long response time to recognize the overshoot of the injection pressure, when the high-speed range of the motor is used, the overshoot shown by a diagonally shaded area in FIG. 2 is generated due to the slow response. Accordingly, a molded article becomes overpacked and the amount of resin is significantly larger than a standard value. This may lead to damage of the metal mold.

Therefore, when the injection pressure is used as the control information, the high-speed range of the motor cannot be used. This means that a high output range of the motor also cannot be used.

On the other hand, a high-speed injection and high-speed depressurization controlling method using a high-speed and high-output motor is proposed. The depressurization control is set to control movement of the screw in a backward direction before completion of the injecting process. In this method, the above problems will be solved using the speed information having a faster response. Four setting items for the injecting process in this method are as follows, and will be described with reference to FIGS. 3 and 4:

1. Advanced position of the screw after the injection is started. This is set to A mm.

2. Advancing speed of the screw. This is set to B mm/sec.

3. Retreated position of the screw after the screw is moved forward. This is set to C mm.

4. Retreating speed of the screw. This is set to D mm/sec.

The pressure characteristic is controlled by the foregoing four settings.

However, when the screw is moved at a high speed, it becomes difficult to assure accuracy of the stopped positions, i.e., positions A and C.

SUMMARY OF THE INVENTION

Accordingly, it is an object of the present invention to provide a method for controlling the screw position by which the accuracy of screw-position control in high-speed injection and high-speed depressurization, which is proposed in order to use a high-speed and high-output range of a motor for molding, can be improved.

It is another object of the present invention to provide an injection molding machine which is suitable to perform the above-mentioned method for controlling the screw position.

The present invention is a method for controlling the screw position in an injection molding machine to which a high-speed injection and high-speed depressurization method for performing the entire injection process by screw-speed control is applied.

According to an aspect of the present invention, the screw is moved forward to a predetermined first position from an injection start position. When reaching the first position, the screw is moved backward to a predetermined second position. The speeds of forward and backward movement of the screw are controlled in accordance with a screw-position/screw-speed characteristic pattern which is measured in advance and which is derived from the equation $V=(2 \cdot K \cdot S)^{1/2}$ where V is screw speed, K is screw acceleration, and S is screw position.

According to the present invention, a motor-driven injection molding machine is provided, in which the high-speed injection and high-speed depressurization method for performing the entire injection process by screw-speed control is adopted. The motor-driven injection molding machine comprises a servomotor for moving the screw forward and backward, a position detector for detecting the position of the screw, and a controller for controlling the speed of the forward and backward movement of the screw by differentiating the screw position detected by the position detector and by calculating the screw speed. The controller moves the screw from an injection start position to a predetermined first position, and when the screw reaches the first position, the controller moves the screw backward to a predetermined second position. The speeds of the forward and backward movement of the screw are controlled in accordance with a screw-position/screw-speed characteristic pattern which is measured in advance and which is derived from the equation $V=(2 \cdot K \cdot S)^{1/2}$ where V is screw speed, K is screw acceleration, and S is screw position.

DESCRIPTION OF THE PREFERRED EMBODIMENTS

Figure 1:
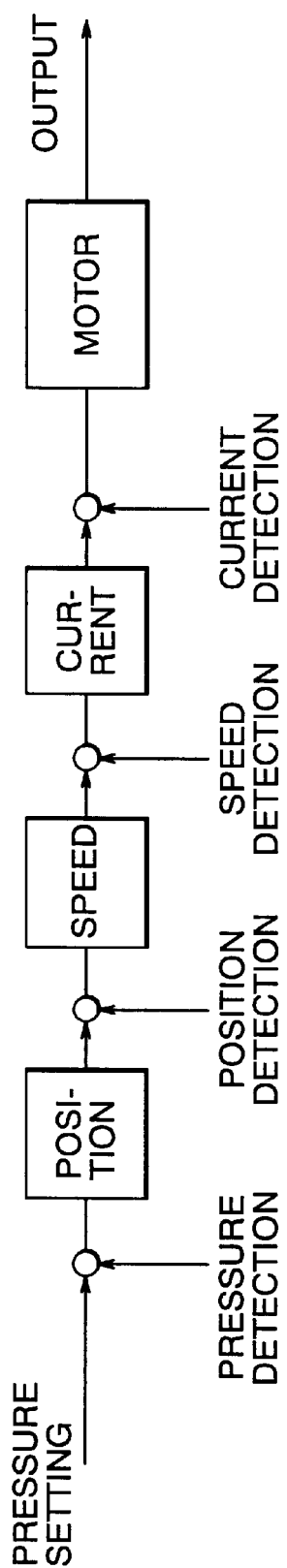
FIG. 1 is a schematic diagram showing a typical control system of a motor in a conventional motor-driven injection molding machine.
Figure 2:
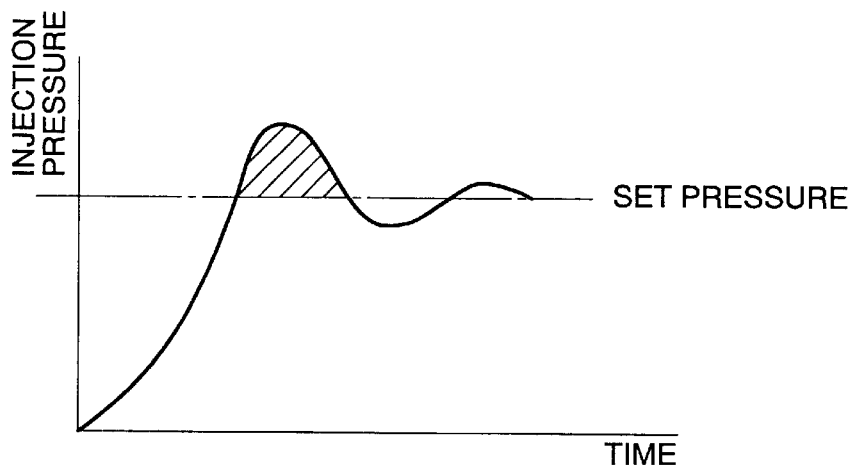
FIG. 2 is a graph showing a time/injection-pressure characteristic for explaining an overshoot in a conventional injecting process.
Figure 3:
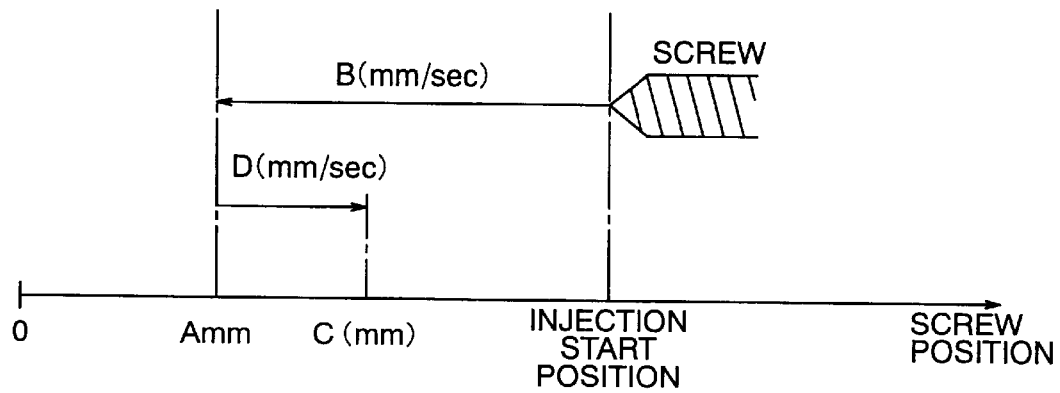
FIG. 3 is an explanatory view of a conventional high-speed injection and high-speed depressurization method.
Figure 4:
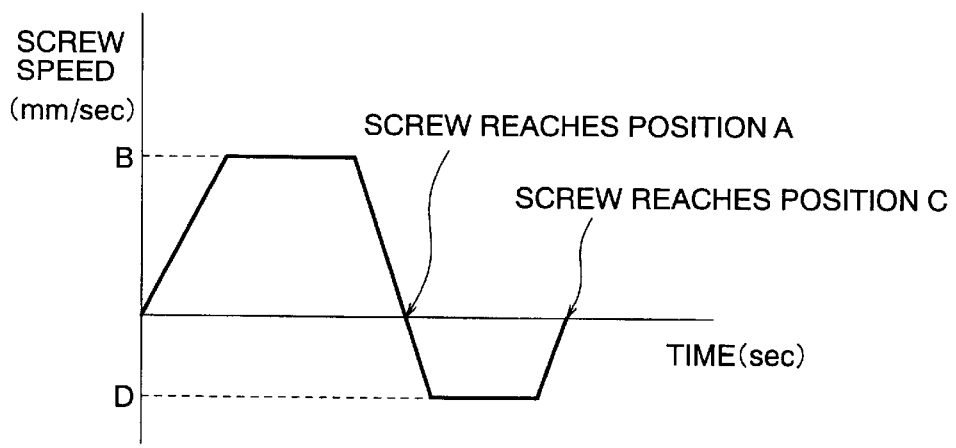
FIG. 4 is a graph showing a setting example of the speed of a screw in FIG. 3.
Figure 5:
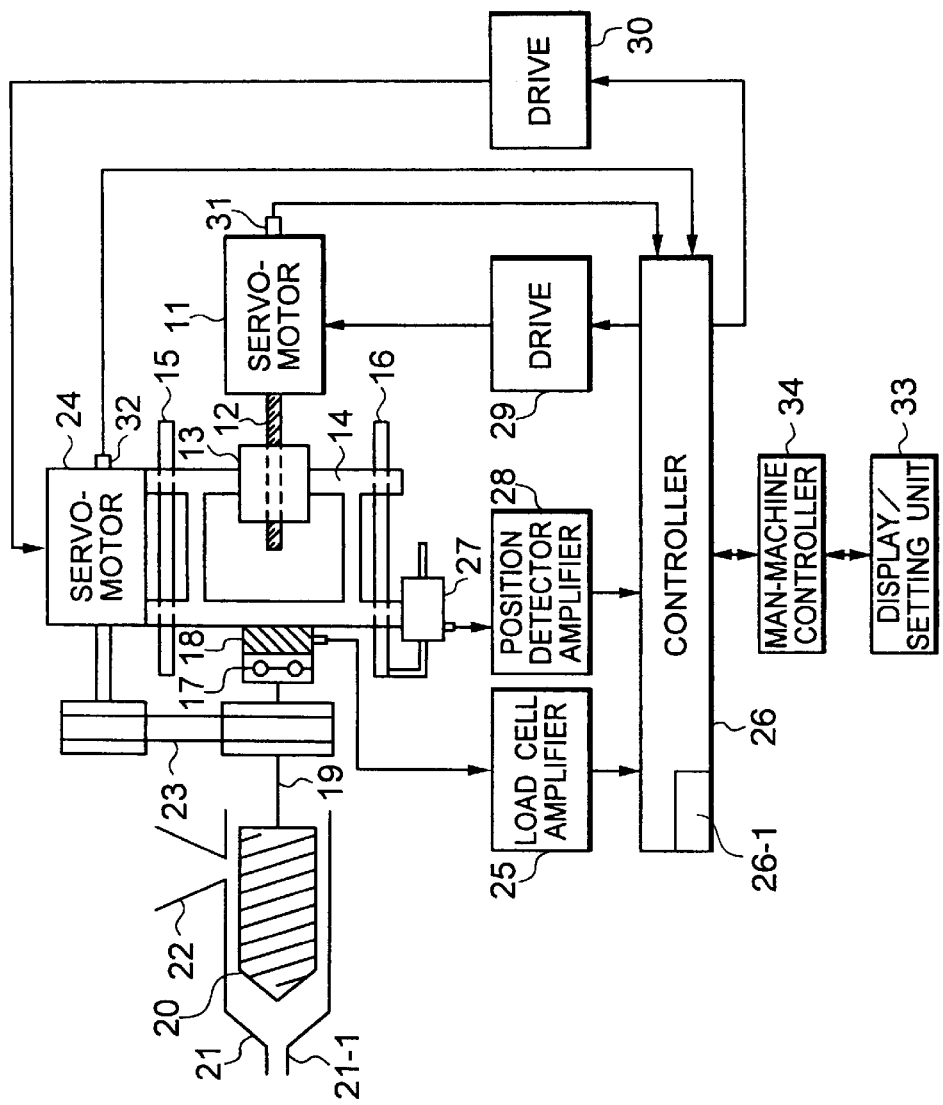
FIG. 5 is a view showing a structure of a motor-driven injection molding machine according to the present invention, focusing on an injection unit.

Referring to FIG. 5, a motor-driven injection molding machine will be described focusing on an injection unit. The motor-driven injection molding machine has an injection unit, which is driven by a servomotor. In such an injection unit, rotation of the servomotor is converted into linear motion by a ball screw and a nut, thereby moving a screw forward and backward.

In FIG. 5, the rotation of an injection servomotor 11 is transmitted to a ball screw 12. A nut 13 is fixed on a pressure plate 14 and is moved forward and backward by rotation of the ball screw 12. The pressure plate 14 is movable along four guide bars 15 and 16 (only two are shown in the figure) fixed on a base frame (not shown). Forward and backward movement of the pressure plate 14 is transmitted to a screw 20 via a bearing 17, a load cell 18, and an injection shaft 19. The screw 20 is disposed in a heating cylinder 21 such that rotary and axial movement can be achieved. The heating cylinder 21 includes a hopper 22 for feeding a resin to a position corresponding to the rear portion of the screw 20. Rotary motion of a servomotor 24 for rotating the screw 20 is transmitted to the injection shaft 19 via a connecting member 23 which may be a belt, pulleys, etc. In other words, the servomotor 24 rotates the injection shaft 19 which in turn rotates the screw 20.

In a measuring process, the screw 20 rotates and moves backward in the heating cylinder 21. As a result, a molten resin is stored in front of the screw 20, that is, at a nozzle 21-1 side in the heating cylinder 21. The backward movement of the screw 20 is caused by pressure due to a gradual increase in the amount of molten resin stored in front of the screw 20.

In an injecting and filling process, the forward movement of the screw 20 in the heating cylinder 21 is caused by a driving force from the injection servomotor 11, so that the molten resin stored in front of the screw 20 is forced into and is pressurized in a metal mold. In this case, the force required for pressing the molten resin is measured by the load cell 18 as an injection pressure. The measured injection pressure is amplified by a load cell amplifier 25 and is fed into a controller 26. The pressure plate 14 has a position detector 27 to measure the amount of movement of the screw 20. The measuring signal outputted from the position detector 27 is amplified by a position detector amplifier 28 and is fed into the controller 26.

The controller 26 outputs current (torque) instruction values corresponding to the respective processes and based on values preset by a display/setting unit 33 via a man-machine controller 34. The current instruction values are fed to a drive 29 and a drive 30. The drive 29 controls a current for driving the servomotor 11 to control an output torque of the servomotor 11. The drive 30 controls a current for driving the servomotor 24 to control the number of revolutions of the servomotor 24. The servomotor 11 and the servomotor 24 include encoders 31 and 32, respectively, to measure the number of revolutions. The number of revolutions detected by the encoders 31 and 32 are fed to the controller 26. In particular, the number of revolutions detected by the encoder 32 is used to determine the number of revolutions of the screw 20.

Figure 6:
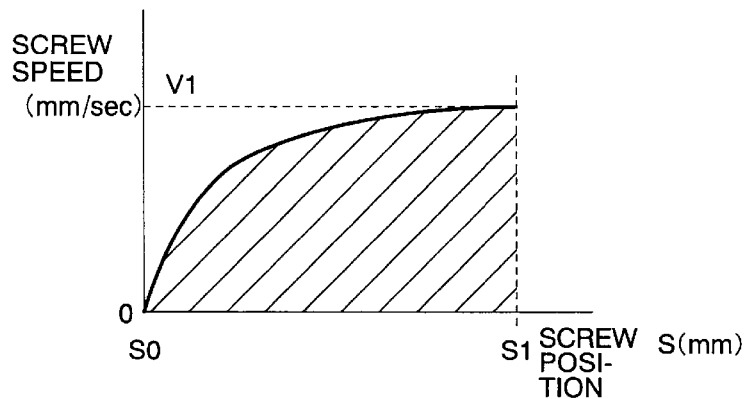
FIG. 6 is a graph showing a position/speed characteristic of a screw to explain the principle of the present invention.
Figure 7:
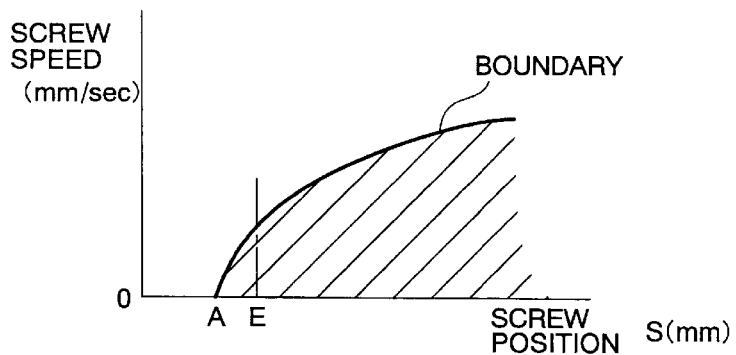
FIG. 7 is a graph showing a position/time characteristic of the screw at the time of high-speed injection in the present invention.
Figure 8:
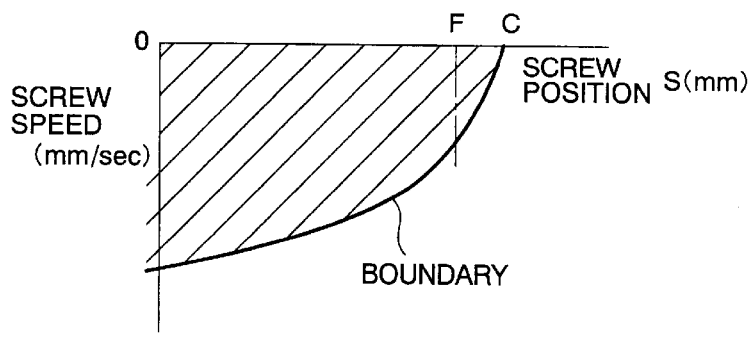
FIG. 8 is a graph showing a position/speed characteristic of the screw at the time of high-speed depressurization in the present invention.

Referring to FIGS. 6 to 8, the principle of the method for controlling the screw position according to the present invention will be described.

In general, the relationship among the speed, the acceleration, and the position of the screw can be expressed by the following equation:

$$V^2 = 2 \cdot K \cdot S$$

where V is screw speed (mm/sec), K is acceleration (mm/sec$^2$), and S is screw position (mm).

A screw-position/speed characteristic found by the above equation is shown in FIG. 6. In the above equation and FIG. 6, it is shown that in order to stop the screw at a position S0, after the screw started to move at a position S1, the screw speed must be V1 or less. In other words, the screw speed relative to the screw position must be in a diagonally shaded area in FIG. 6. Accordingly, when this concept is applied to high-speed injection, a result shown in FIG. 7 is obtained, and when applied to the high-speed depressurization, a result shown in FIG. 8 is obtained.

In this instance, as described above, an overrun phenomenon is exhibited such that the response speed for control is late due to the high-speed movement of the screw, and the stop position of the screw exceeds the target. Therefore, with reference to FIG. 7, an area where the speed command is forcedly set to zero is set at a position E slightly before a stop target position A. On the other hand, with reference to FIG. 8, an area where the speed command is caused to be set to zero is set at a position F slightly before a stop target position C.

Subsequently, an embodiment of the method for controlling the screw-position according to the present invention will be described with regard to the case in which it is applied to the motor-driven injection molding machine described in FIG. 5. In this case, the controller 26 determines the position of the screw 20 by the signal from the position detector amplifier 28 and differentiates it to determine the speed of the screw 20.

In this embodiment, a screw-position/speed characteristic pattern at the time of high-speed injection shown in FIG. 7 and a screw-position/speed characteristic pattern at the time of high-speed depressurization shown in FIG. 8 are each measured in advance. These measured patterns are expressed by the equation $V=(2\cdot K\cdot S)^{1/2}$ and are stored in the memory 26-1 in the controller 26.

The control operation of the controller 26 will be described hereinbelow.

When the injection process is started, the screw 20 is moved forward from an injection start position to the position A at a speed of B mm/sec. At this time, the controller 26 recognizes the boundary of the position/speed characteristic pattern at the time of high-speed injection, which delimitates the diagonally shaded area in FIG. 7, as a barrier, monitors the screw 20 so that the speed does not exceed the barrier, and thus controls the screw speed. In other words, the controller 26 compares the screw speed calculated by the detected screw position with a reference speed which corresponds to the detected screw position in the position/speed characteristic pattern at the time of high-speed injection, and controls the injection servomotor 11 so that the calculated screw speed does not exceed the reference speed.

When the screw 20 reaches the position E shown in FIG. 7, the process shifts to the high-speed depressurizing process. More specifically, the controller 26 reverses the polarity of the speed command to the injection servomotor 11, and moves the screw 20 backward to the position C at a speed of D mm/sec. At this time, the controller 26 recognizes the boundary of the position/speed characteristic pattern at the time of high-speed depressurization, which delimitates the diagonally shaded area in FIG. 8, as a barrier, monitors the screw 20 so that the speed does not exceed the barrier, and thus controls the screw speed. When the screw 20 reaches the position F shown in FIG. 8 by the backward movement, the controller 26 commands the screw 20 to stop. As a result, the screw 20 stops at the position C thus completing the injecting process. Subsequently, a dwelling process is performed.

Figure 9:
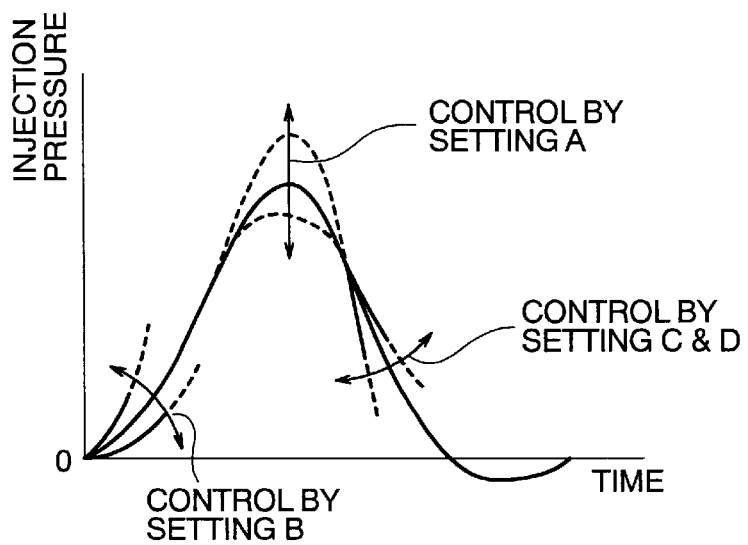
FIG. 9 is a graph showing a time/injection pressure characteristic to explain the control of a rise and a fall of the injection pressure in the present invention.

In the conventional injection-pressure control, only one set value of the pressure should be used in order to control the injection pressure. In contrast to this, in the high-speed injection and high-speed depressurization, raising (i.e., the gradient) of the injection pressure and the peak pressure can be controlled by the position A and the speed B, as shown in FIG. 9, and the gradient at which the injection pressure falls from the peak pressure can be controlled by the position C and the speed D.

Figure 10:
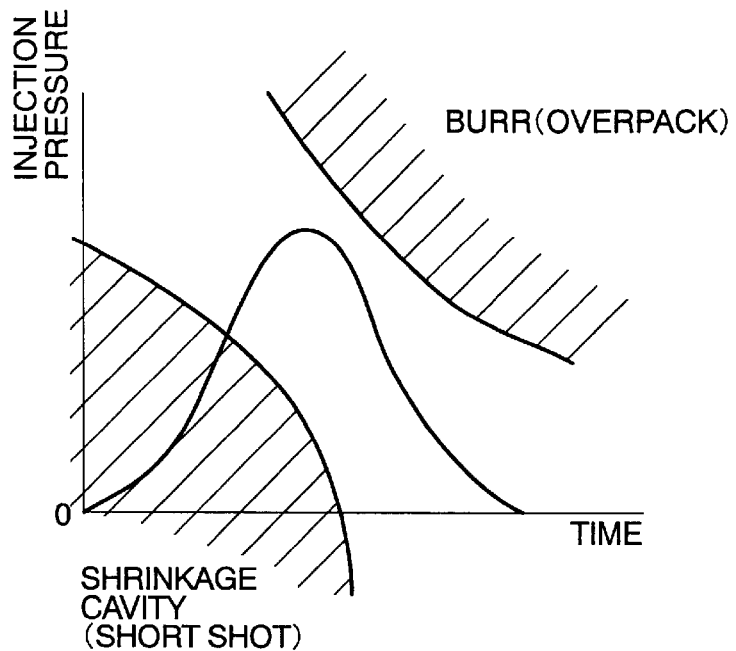
FIG. 10 is a graph showing a time/injection pressure characteristic to explain that a short shot and an overpack can be avoided in the present invention.

Furthermore, as shown in FIG. 10, a control characteristic to successfully overcome an area in which a shrink mark (short shot) and a burr (overpack) are generated in the time/injection pressure characteristic can be designed more flexibly.

Also, accurate and stable position control can be achieved by using a barrier concept in the screw-position control, and the penetration of the barrier by the screw due to the high-speed movement thereof, namely, the overrun can be prevented.

As described above, according to the present invention, the accuracy of the screw-position control in the high-pressure injection and high-speed depressurization can be improved. Consequently, molded articles of better quality having no short shot and no overpack can be produced.

What is claimed is:

1. A method for controlling the screw-position of a screw in an injection molding machine in which a high-speed injection and high-speed depressurization method is adopted to perform the entire injecting process by controlling speed of the screw, comprising the steps of:

moving the screw forward to a predetermined first position from an injection start position, and when the screw reaches the predetermined first position, moving the screw backward to a predetermined second position; and controlling the speeds of forward and backward movement of the screw in accordance with a screw-position/screw-speed characteristic pattern, which is measured in advance and which is derived from the equation $V=(2 \cdot K \cdot S)^{1/2}$ where V is screw speed, K is screw acceleration, and S is screw position.

2. A method for controlling the screw-position according to claim 1, further comprising the steps of:

setting a speed command to zero at a first selected position before the predetermined first position and shifting the process to high-speed depressurization when the screw is moved forward, thereby preventing overrun from the predetermined first position; and setting the speed command to zero at a second selected position before the predetermined second position and completing high-speed depressurization when the screw is moved backward, thereby preventing overrun from the predetermined second position.

3. A method for controlling the screw-position according to claim 2, wherein the injection molding machine is a motor-driven injection molding machine, and wherein the motor-driven injection molding machine comprises a servomotor to move the screw forward and backward.

4. A method for controlling the screw-position according to claim 3, wherein the motor-driven injection molding machine further comprises position detecting means for detecting the position of the screw, and control means for controlling the speeds of the forward and backward movement of the screw, by differentiating the screw position detected by the position detecting means and by calculating the speed of the screw.

5. A method for controlling the screw-position according to claim 4, wherein the control means includes a memory, and wherein the screw-position/screw-speed characteristic pattern which is measured in advance is stored in the memory.

6. A method for controlling the screw-position of a screw in an injection molding machine in which high-speed injection and high-speed depressurization are adopted to perform the entire injecting process by controlling speed of the screw, comprising the steps of:

moving the screw forward to a predetermined first position from an injection start position, and when the screw reaches the predetermined first position, moving the screw backward to a predetermined second position;

controlling the speeds of the forward and backward movement of the screw in accordance with a screw-position/screw-speed characteristic pattern, which is measured in advance and which is derived from the equation $V=(2 \cdot K \cdot S)^{1/2}$ where V is screw speed, K is screw acceleration, and S is screw position;

setting a speed command to zero at a first selected position before the predetermined first position and shifting the process to high-speed depressurization when the screw is moved forward, thereby preventing overrun from the predetermined first position; and setting the speed command to zero at a second selected position before the predetermined second position and completing high-speed depressurization when the screw is moved backward, thereby preventing overrun from the predetermined second position.

* * * * *